(12) United States Patent
Love

(10) Patent No.: US 8,959,249 B1
(45) Date of Patent: Feb. 17, 2015

(54) COOPERATIVE CLOUD I/O SCHEDULER

(75) Inventor: Philip Love, Alhambra, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/960,793

(22) Filed: Dec. 6, 2010

Related U.S. Application Data

(63) Continuation of application No. 12/908,811, filed on Oct. 20, 2010.

(60) Provisional application No. 61/383,286, filed on Sep. 15, 2010.

(51) Int. Cl.
G06F 3/00 (2006.01)

(52) U.S. Cl.
USPC .............................................. 710/6

(58) Field of Classification Search
CPC .................. G06F 3/0664; G06F 2009/45579
USPC .............................................. 710/6
See application file for complete search history.

(56) References Cited

U.S. PATENT DOCUMENTS

| | | | |
|---|---|---|---|
| 6,754,718 B1 * | 6/2004 | Dobberpuhl et al. | 709/250 |
| 7,251,242 B2 | 7/2007 | Schrodi | |
| 7,251,815 B2 | 7/2007 | Donovan et al. | |
| 7,797,699 B2 | 9/2010 | Kagi et al. | |
| 8,046,550 B2 * | 10/2011 | Feathergill | 711/162 |
| 2009/0083734 A1 * | 3/2009 | Hotra | 718/1 |
| 2011/0125951 A1 * | 5/2011 | Youngworth | 711/6 |

OTHER PUBLICATIONS

VMware, "Storage I/O Control Technical Overview and Considerations for Deployment", VMware vSphere 4.1, Technical White Paper. pp. 1-12.
VMware, "Managing Performance Variance of Applications Using Storage I/O Control", VMware vSphere 4.1, Performance Study. pp. 1-16.

* cited by examiner

Primary Examiner — Chun-Kuan Lee
(74) Attorney, Agent, or Firm — Dergosits & Noah LLP; Todd A. Noah

(57) ABSTRACT

This disclosure describes a system and method for providing I/O scheduling capabilities to a host server executing one or more virtual machine clients and communicating with a cloud-based storage array. An I/O scheduler executing on a virtual machine can identify priority tags associated with requests or commands on the virtual machine. The I/O scheduler can create one or more queues based upon the priority of each request, and can then transmit requests in order of priority. The I/O scheduler can also use information about the storage array, such as layout information or cache information, and can accordingly optimize the transmission of requests to the storage array.

18 Claims, 3 Drawing Sheets

COOPERATIVE CLOUD I/O SCHEDULER

CROSS-REFERENCE TO RELATED APPLICATIONS

This application is a continuation patent application of U.S. patent application Ser. No. 12/908,811, entitled "COOPERATIVE CLOUD I/O SCHEDULER," filed on Oct. 20, 2010, which is a nonprovisional patent application of provisional U.S. Patent Application No. 61/383,286, entitled "COOPERATIVE CLOUD I/O SCHEDULER," filed on Sep. 15, 2010; both of which are incorporated in full herein.

BACKGROUND

This disclosure is directed to optimizing the interactions between a virtual machine ("VM" or "VM client") executing on a physical computer, and a storage array storing data and receiving requests from the VM. In particular, this disclosure is directed to providing input/output ("I/O") scheduling capabilities to a VM that interacts with a storage array. This disclosure is also directed to providing I/O scheduling capabilities to any physical hardware capable of hosting a VM.

On a conventional computing platform, I/O scheduling (also known as "disk scheduling") is an operating system process for organizing read/write requests, commands and/or operations submitted to a storage volume. This process may be performed by an I/O scheduler software application. An I/O scheduler may be configured to reduce "seek time," or the length of time it takes to access data on a storage volume. In some cases, the location of data on the storage volume can affect seek time. For example, if the storage volume is a local hard drive, an I/O scheduler can reduce seek time by intelligently submitting requests in such a way as to minimize drive head movement.

An I/O scheduler may also be configured to reduce "latency," or the delay in time between the submission of a request to a storage volume and receipt of the request at the storage system. Requests may be submitted to a storage volume in the form of a queue. If the queue is not managed efficiently, there may an overabundance of requests submitted to the storage volume, causing network traffic and reducing overall bandwidth. To minimize latency, an I/O scheduler may adopt various queue control methods.

An I/O scheduler may use one or more scheduling algorithms to minimize seek time, reduce latency, or otherwise streamline the request submission process. Scheduling algorithms may use data from the computing platform's operating system, data from applications running on the operating system, and/or data pertaining to the storage volume. However, the data available for current scheduling algorithms and I/O schedulers is only useful in accessing local hard drives. As a result, current I/O schedulers are ineffective in an environment where read/write requests are submitted to a remote storage array, such as that found in a cloud computing network. In other words, even though a VM may have I/O scheduling software as part of its operating system, the data used by this software is directed to optimizing local storage, not cloud-based storage.

Moreover, running a current I/O scheduler on a VM can also be ineffective, since current I/O schedulers are not configured for operation in a virtual environment where multiple VMs can run on a single computing platform, or VM host server. A current I/O scheduler only contemplates managing requests from a single client. As more VMs are launched using a single computing platform, a current I/O scheduler is unable to organize requests from multiple VM clients, which causes network traffic, bandwidth issues, and ultimately, a loss in productivity from the VMs whose requests are not being processed.

Previous attempts to provide I/O scheduling functions to VMs only manage bandwidth between a server hosting the VMs and an associated storage volume. For example, storage I/O control ("SIOC"), such as that provided for the VMware® vSphere™, prioritizes a VM's access to storage volume shares based upon the number of shares allocated to that VM. In other words, SIOC provides I/O control to the storage volume, but not directly on or from the VM. SIOC monitors network traffic from multiple VM servers to a single remote storage volume (or "datastore"). Each VM server can host one or more VMs, and each VM executing on the VM server has an allocated number of shares on the storage volume. In addition, each VM transmit a single queue of requests to the storage volume. When latency for a queue exceeds a certain threshold (e.g., 30 ms), the bandwidth is reduced in proportion to the number of storage volume shares allocated to each VM. A VM with more shares on the storage volume will be allowed a larger percentage of available bandwidth, and a VM will less shares on the storage volume will be allowed a smaller percentage of overall bandwidth. While such I/O control measures may help control overall network traffic, this type of queue management is not sufficiently granular for individual requests submitted from one VM to a remote storage array, nor do these measures consider the priority of individual requests from each VM.

DETAILED DESCRIPTION

Figure 1:
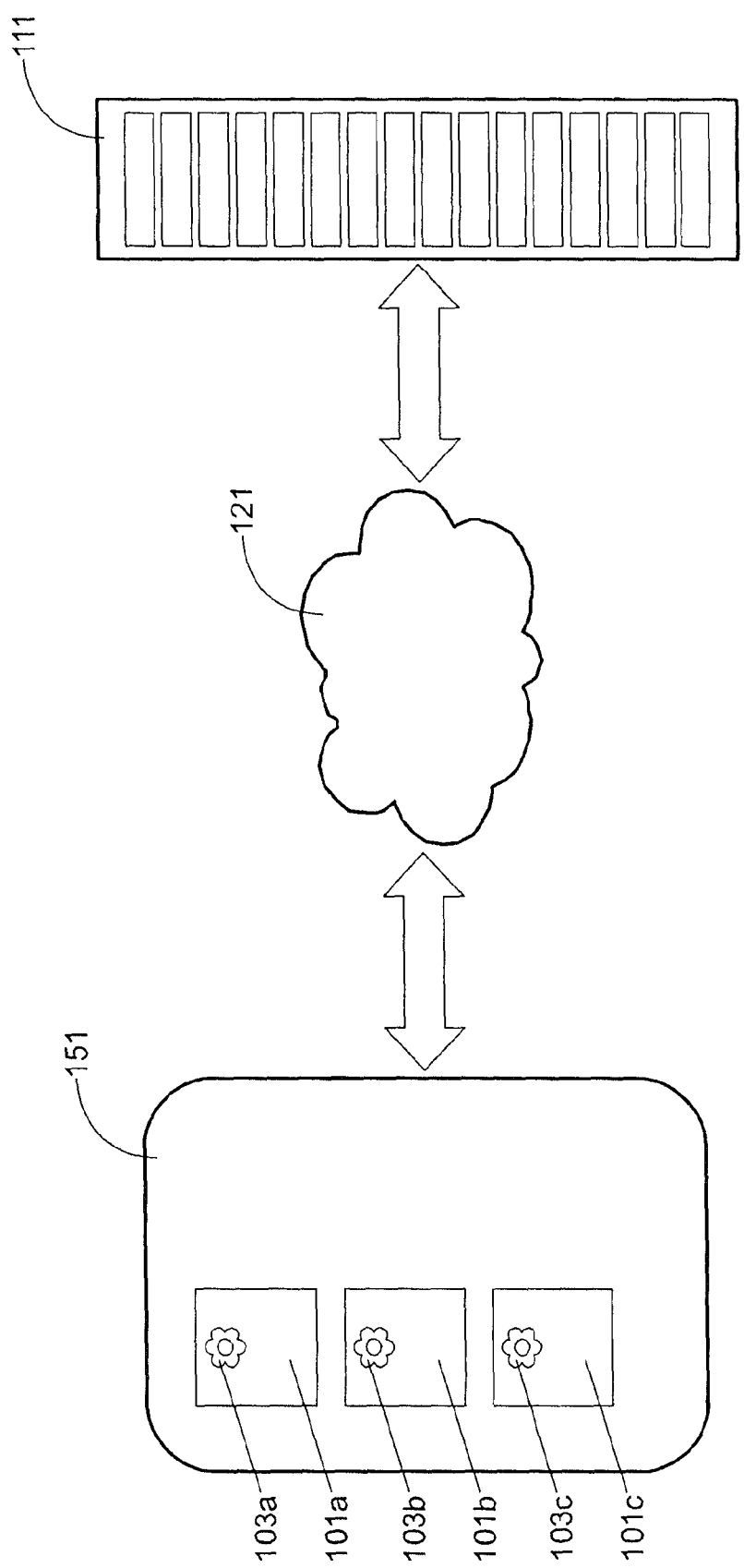
FIG. 1 is a block diagram of a system embodiment.

Disclosed herein is a system and method for providing I/O scheduling for a VM transmitting requests to and receiving responses from a remote cloud-based storage array. In an embodiment, an I/O scheduler executes on the VM and identifies request priority data on the VM, and uses the priority data to organize requests and transmit the organized requests to a storage array. In an embodiment, an I/O scheduler executes on the VM and receives information about the storage array, and uses the received information to organize requests and transmit the organized requests to a storage array. Providing an I/O scheduler specific to a VM may optimize request transmissions between the VM and the storage array, minimizing seek time and reducing latency, while also improving the overall utilization of the storage array.

Embodiments of this disclosure can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing an embodiment. Applications may also be downloaded in whole or in part through the use of a software development kit or toolkit that enables the creation and implementation of an embodiment. In this specification, these implementations, or any other form that an embodiment may take, may be referred to as techniques. In general, the order of the steps of disclosed processes may be altered within the scope of this disclosure.

FIG. 1 is a block diagram illustrating an embodiment of a system incorporating the I/O scheduler disclosed herein. As shown, server 151 hosts one or more VMs 101a, 101b, 101c and so forth. Server 151 may be any computer capable of hosting a VM, regardless of operating system. In an embodiment, server 151 may be any type of SCSI initiator. In an embodiment, an I/O scheduler may reside on each VM. In an embodiment, VM 101a is a template VM client with an I/O scheduler 103a, and as the other VMs 101b and 101c, and 101d are cloned from VM 101a, each cloned VM will have its own I/O scheduler 103b and 103c, and 103d.

As shown in FIG. 1, server 151 has access to storage array 111 over network 121. The requests and responses transmitted between server 151 and storage array 111 may be referred to collectively as "in-flight operations" or "in-flight ops." Storage array 111 may be any type of remote or cloud-based storage volume, and may across one or more backend disks for storing data for the VMs hosted by server 151. In an embodiment, storage array 111 may be any type of SCSI target. In an embodiment, server 151 may be a VMware ESX® server, and storage 111 may be an EMC Clariion® disk array.

In addition to what is illustrated in FIG. 1, other system configurations may be possible without departing from this disclosure. FIG. 1 is not intended to limit this disclosure to any one configuration. In an embodiment, portions of server 151 and storage array 111 may share hardware components. Server 151 may include a plurality of storage volumes that are coupled to form a distributed disk array that operates as a storage array 111 such that VMs 101a, 101b and 101c, and 101d are on the same cluster of physical hardware as storage array 111.

The following paragraphs describe various ways to provide I/O scheduling capabilities to a VM hosted by server 151. Although this disclosure references a single I/O scheduler, each of the I/O schedulers illustrated in FIG. 1 may share the same capabilities of the single I/O scheduler. Reference to a single I/O scheduler is not intended to limit this disclosure to any single embodiment.

In an embodiment, the I/O scheduler can utilize a priority tag (sometimes abbreviated as "PRI") associated with a request. A priority tag may identify the relative importance of a request as determined by the operating system or application issuing the request, and can comprise metadata, a number or other identifier. The operating system or application may generate a priority tag contemporaneously with a request or later added to a request. Alternatively or additionally, a user or system administrator may manually assign a priority tag to a request. In an embodiment, the I/O scheduler can determine the relative importance of a request and assign an appropriate priority tag.

Different protocols may use a different format for the priority tag, but the purpose for the priority tag is similar in each protocol. For example, in the SCSI protocol, a priority tag can form part of a request (or "block command"), such as an appended parameter code or encoded series of bits. Other protocols, such as NFS or CIFS may define other priority tag semantics that may also be used by one or more embodiments disclosed herein. In an embodiment, the I/O scheduler can identify and understand priority tags regardless of the protocol. For example, the I/O scheduler can reside on a virtual machine that includes requests and associated priority tags of many different protocols, or a host server can execute multiple virtual machines, each virtual machine using a different protocol, and each virtual machine running an I/O scheduler that understands the priority tags generated on the respective virtual machine.

Figure 2:
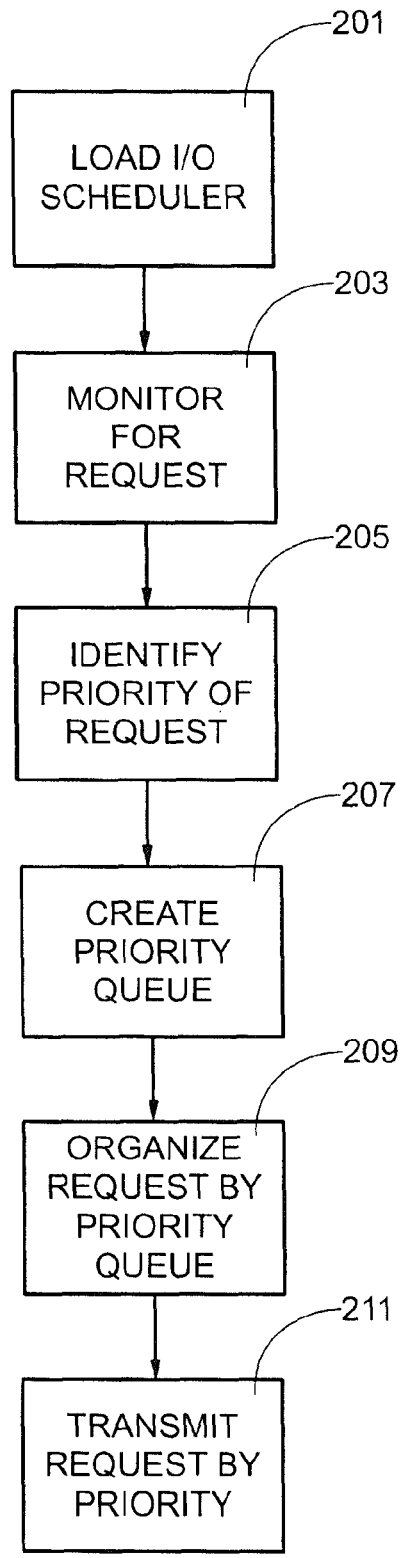
FIG. 2 is a flow diagram of a method embodiment.

FIG. 2 is a flow diagram depicting an embodiment of a method for identifying priority tags present in a VM, using the system illustrated in FIG. 1. In the examples described herein, a request intended for transmission to storage array 111 will already be associated with a respective priority tag. In block 201, the VM 101a loads an operating system with an I/O scheduler 103a. Block 201 may refer to whenever the VM is booted up. In an embodiment, the I/O scheduler can be manually activated through a user interface. In an embodiment, the I/O scheduler can initialize whenever latency or seek time exceed a predetermined threshold, which can be set by a system administrator or be a default configuration of the operating system or I/O scheduler itself. For example, in an embodiment, the I/O scheduler can initialize when latency reaches 30 ms. However, other methods for initializing and/or executing the I/O scheduler may also be contemplated without departing from this disclosure.

In block 203 of FIG. 2, the I/O scheduler 103a monitors for a request intended for transmission to storage array 111. If the request has an associated priority tag, then in block 205, I/O scheduler 103a identifies the relative level of priority for the request. For example, there may be three levels of priority: high, medium, and low. Other levels of priority may be defined as well. For example, priority may be represented by an integer or four-bit code, such that "1h" represents the highest priority, with increasing priority values indicating lower scheduling importance. For illustrative purposes only, the following non-limiting examples apply three tiers of priority: high, medium, and low.

In block 207 of FIG. 2, the I/O scheduler creates a separate queue for each level of priority, i.e., a high priority queue, a medium priority queue, and a low priority queue. In block 209, requests are grouped in the queue that corresponds to their level of priority. For example, high priority requests are grouped in a high priority queue, medium priority requests are grouped in a medium priority queue, and low priority requests are grouped in a low priority queue. Other factors may be considered for grouping requests in respective priority queues. For example, as will be discussed below, priority tags may not be the only method for categorizing and grouping requests. In an embodiment, rather than creating a separate queue for each level of priority, the I/O scheduler can utilize a single queue, but requests are ordered according to priority. In this fashion, higher priority requests may be placed at the front of the queue so that they are serviced before lower priority requests, which may be placed at the rear of the queue. However, in the embodiment shown in FIG. 2 and described herein, the I/O scheduler creates and uses a plurality of corresponding priority queues such that higher priority requests are transmitted in one queue, and lower priority requests are transmitted in another queue.

In block 211 of FIG. 2, requests are transmitted to storage array 111 according to the level of priority of the respective queue. In an embodiment, high priority queues are transmitted before lower priority queues. Alternatively or additionally, if there are too many requests being transmitted to the storage array 111, thereby increasing latency and causing network traffic (as measured by latency), the I/O scheduler can reduce or suspend transmission of lower priority queues while allowing transmission of higher priority queues to continue until latency is reduced.

Organizing requests in a plurality of corresponding queues may result in shorter queues than the single queue currently used in VM host server-storage volume environments. This may in turn reduce the number of in-flight operations between the VMs and the storage array. As discussed above, even though an application executing on a current VM may have associated a priority tag with a request, current VMs are not capable of utilizing the priority tag. As a result, current VMs transmit requests to a storage volume in the form of a single queue, and requests must be serviced sequentially, regardless of priority. Transmitting a single, unordered queue of requests to a storage volume increases latency. However, applying an embodiment of this disclosure and grouping requests by priority into smaller queues reduces latency issues, since the smaller number of requests will be more efficiently serviced. If latency does increase, the I/O scheduler can allow for transmission of higher priority requests over lower priority requests. Because the I/O scheduler is able to identify and utilize priority tags, as well as optimize transmissions based upon monitored latency and network bandwidth to storage array 111, the I/O scheduler frees up the resources of the storage array 111 that might other be used to process unordered queues of requests.

Queue management provides many other mechanisms for optimizing transmissions between the server 151 and storage array 111. In an embodiment, the I/O scheduler can consider the length of different queues. Shorter queues may be transmitted before longer queues, or longer queues may be delayed or transmitted in stages to allow for servicing of other queues. In an embodiment, the I/O scheduler can consider the time a request has been on the queue. If a request has not been serviced within a pre-set time interval, or has been delayed repeatedly by a large number of higher priority requests, the I/O scheduler may move the delayed request to a part of a queue that enables faster servicing, or the I/O scheduler may move the request to another queue to ensure faster servicing. In an embodiment, the I/O scheduler can consider the number of outstanding operations on the queue. As will be discussed further below, some or all of this information may be used to optimize transmissions to the storage array 111.

In an embodiment, I/O scheduling capabilities may be enhanced with intelligence from the storage volume. The following discloses various methods for incorporating information about the storage array. In the following section, reference is made to one or more VMs executing on server 151 and communicating with storage array 111.

In an embodiment, the I/O scheduler can utilize information from sources outside the VM in order to optimize the transmission of requests to the storage array. For example, if the storage array provides information regarding the layout of its backend disks, the I/O scheduler can use logical to physical mapping to organize and group requests based upon this information. In another example, the storage array may provide information about the size of its memory buffers, such as its write cache. The I/O scheduler can apply this information and ensure that the transmitted queues do not overflow the buffer. Other information about the storage array can also be applied by the I/O scheduler. In this manner, the I/O scheduler may be enhanced with storage intelligence.

Any information transmitted from storage array 111 to server 151 may be used by any hardware or software component associated with server 151 besides an I/O scheduler. For example, any application executing on a VM, or the VM filesystem itself, may use storage array 111 layout information. In an embodiment, one or more VMs executing on server 151, or server 151 itself may request layout information from storage array 111, and an I/O scheduler such as the one described herein may also use this information to optimize the transmission of requests to storage array 111.

Figure 3:
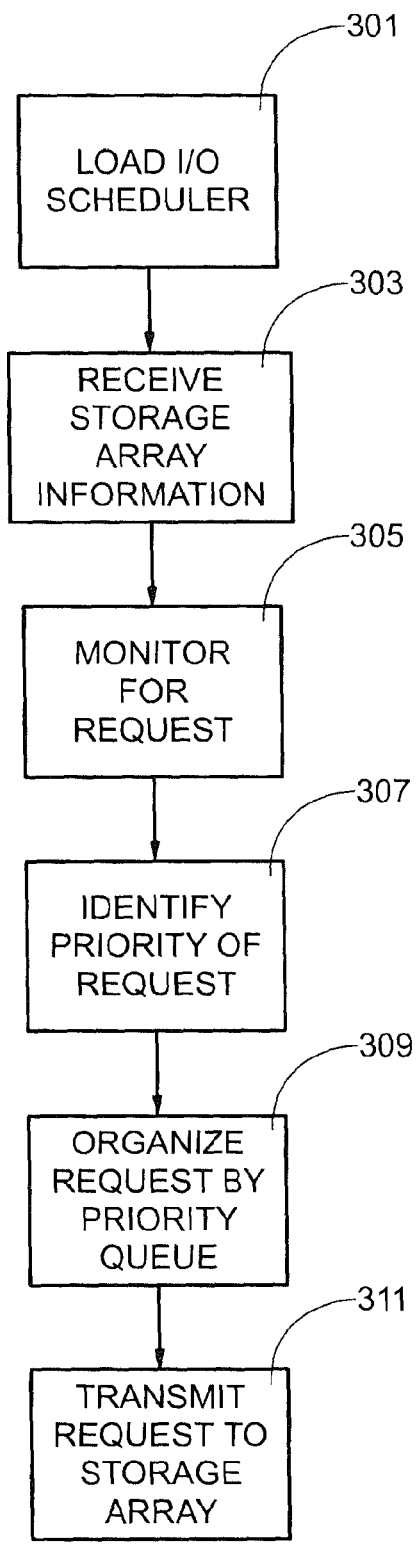
FIG. 3 is a flow diagram of a method embodiment.

FIG. 3 is a flow diagram depicting an embodiment of a method for I/O scheduling on a VM using information about the storage array 111 of FIG. 1. In this embodiment, the storage array 111 uses the VMDK disk format, and data from any one of the VMs hosted by server 151 may be spread across multiple disks in storage array 111. In block 301 of FIG. 3, the VM 101a loads an operating system with an I/O scheduler 103a. As discussed above with respect to FIG. 2, other methods for loading I/O scheduler 103a may also be used in block 301. In block 303, storage array 111 transmits its VMDK layout to VM 101a.

There are many ways to provide VMDK layout or mapping information to the VM 101a. For example, in an embodiment, a SCSI INQUIRY command can be issued to the storage array 111, resulting in coarse grained LUN information. In an embodiment, storage array 111 may add mapping information to a response. For example, VM 101a may transmit a request that includes an instruction that the response from storage array 111 include the physical location on storage array 111 that serviced the request. Storage array 111 may require software instructions that enable it to associate layout information with responses, such that when responses to requests are transmitted back to a virtual machine, the response will include corresponding layout information for the portion of the storage array that serviced the request and transmitted the response. In this fashion, I/O scheduler can build a database containing location information associated with each response, thereby generating its own map for storage array 111.

The I/O scheduler may be able to utilize any layout information provided by the storage array 111. The layout information for storage array 111 may be complete layout information, or partial layout information. It may be in the form of a "snapshot" or may provide information on memory allocation or thin provisioning on storage array 111. Layout information may be provided by exposing an API. Layout information may comprise multiple layers, or as described previously, may specifically identify the physical location of where a request was serviced on storage array 111. Providing the I/O scheduler with intelligence about storage array 111 may allow further optimization mechanisms in addition to has been previously described. This information can be used in conjunction with priority tag information in order to provide providing finer grained intelligence. Other methods may be employed without departing from the scope of this disclosure.

In block 305 of FIG. 3, the I/O scheduler 103a monitors for a request intended for transmission to storage array 111. If the request has an associated priority tag, then in block 307, I/O scheduler 103a identifies the relative level of priority for the request (e.g., high, medium, and low). In block 309, the I/O scheduler groups multiple requests by priority and creates a queue for each priority group. In block 311, requests are transmitted to storage array 111. Also in block 311, I/O scheduler 103a may also consider the layout of the VMDK in transmitting requests to storage array 111 such that high priority requests are more readily accessible than low priority requests, or high priority requests are physically mapped to certain locations on storage array 111, such that storage array 111 will not be required to additional request processing. In this fashion, the I/O scheduler executing on the VM frees up the resources of storage array 111.

There are many types of information that can be provided to the I/O scheduler in order to optimize transmissions between respective VMs hosted by server 151 and storage array 111. This disclosure is not limited to using any one method. The I/O scheduler may perform one or more algorithms for determining the most optimal schedule for transmitting requests to storage 111. These one or more algorithms may consider some or all of the techniques described herein, and may include variations of known algorithms such as the elevator algorithm, first in/first out ("FIFO"), last in/last out ("LIFO"), Noop, completely fair queuing, and the like. In an embodiment, an I/O scheduler may consider the priority of a request, the time the request has remained in the queue, and the intended destination of the request on storage array 111, and may accordingly determine when to transmit the request to storage array 111. In an embodiment, I/O scheduler may initiate its own requests to storage array 111 in the form of "pre-fetch requests," in order to "prime" storage array 111 for servicing requests.

As a result of applying embodiments of this disclosure, VM clients running on a host server and communicating with a cloud-based storage array can benefit from reduced latency, minimized seek time, and other advantages of an I/O scheduler traditionally reserved for a conventional computing platform with a local hard drive. In addition, storage arrays receiving data and requests from these VM clients are more efficiently utilized.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely, and are not meant to be limiting in any way. Other steps and functions may be contemplated without departing from this disclosure or the scope of an embodiment.

What is claimed is:

1. A method for managing Input/Output (I/O) scheduling requests from a virtual machine, comprising:
    requesting, by a virtual machine executing on a host computer, layout information for a storage array associated with the host computer;
    receiving, by the virtual machine, the layout information for the storage array;
    identifying, by the virtual machine, one or more scheduling requests for transmission to the storage array;
    organizing, by the virtual machine, the one or more scheduling requests using the received layout information, wherein organizing comprises enabling a scheduler in the virtual machine to create a plurality of queues that each is associated with a corresponding location on the storage array; and
    transmitting, by the scheduler in the virtual machine, the organized scheduling requests from the plurality of queues to the storage array.

2. The method of claim 1, wherein the layout information comprises virtual machine disk format (VMDK) layout information for the storage array.

3. The method of claim 1, wherein after receiving layout information for the storage array;
    storing the layout information in a mapping database.

4. The method of claim 1, wherein transmitting the organized scheduling requests results in a reduction in the number of in-flight operations to the storage array.

5. The method of claim 1, wherein the virtual machine is one of a plurality of virtual machines executing on the host computer, and wherein the one or more scheduling requests are located on one or more of the plurality of virtual machines.

6. The method of claim 1, further comprising, prior to the organizing step,
    identifying, by the virtual machine, one or more priority tags associated with the one or more requests; and
    organizing, by the virtual machine, the one or more scheduling requests in order of priority.

7. The method of claim 6, wherein the step of organizing scheduling requests in priority order comprises creating one or more queues that each corresponds to a level of priority tag.

8. The method of claim 1, wherein requesting layout information further comprises:
    issuing, by the virtual machine, a Small Computer System Interface (SCSI) inquiry to the storage array; and
    receiving, by the virtual machine, logical unit number (LUN) information from the storage array.

9. A computer program product, comprising a computer usable medium having a computer readable program code embodied therein, the computer readable program code adapted to be executed to implement a method for managing Input/Output (I/O) scheduling requests from a virtual machine, comprising:
    requesting, by a virtual machine executing on a host computer, layout information for a storage array associated with the host computer;
    receiving, by the virtual machine, the layout information for the storage array;
    identifying, by the virtual machine, one or more scheduling requests for transmission to the storage array;
    organizing, by the virtual machine, the one or more scheduling requests using the received layout information, wherein organizing comprises enabling a scheduler in the virtual machine to create a plurality of queues that each is associated with a corresponding location on the storage array; and,
    transmitting, by the scheduler in the virtual machine, the organized scheduling requests to the storage array.

10. The computer program product of claim 9, wherein the layout information comprises virtual machine disk format (VMDK) layout information for the storage array.

11. The computer program product of claim 9, further comprising: based on receiving layout information for the storage array, storing the layout information in a mapping database.

12. The computer program product of claim 9, wherein transmitting the organized scheduling requests comprises transmitting the one or more queues.

13. The computer program product of claim 9, wherein the virtual machine is one of a plurality of virtual machines executing on the host computer, and wherein the one or more scheduling requests are located on one or more of the plurality of virtual machines.

14. The computer program product of claim 9, further comprising, prior to the organizing step,
identifying, by the virtual machine, one or more priority tags associated with the one or more requests; and
organizing, by the virtual machine, the one or more requests in order of priority.

15. The computer program product of claim 14, wherein the step of organizing scheduling requests in priority order comprises creating one or more queues that each corresponds to a level of priority tag.

16. The computer program product of claim 9, wherein requesting layout information further comprises:
issuing, by the virtual machine, a Small Computer System Interface (SCSI) inquiry to the storage array; and
receiving, by the virtual machine, logical unit number (LUN) information from the storage array.

17. A method for managing I/O scheduling requests from a virtual machine, comprising:
transmitting, by a scheduler in a virtual machine executing on a host computer, a first scheduling request to a storage array associated with the host computer, the first scheduling request also requesting layout information for a location on the storage array that serviced services the scheduling request, wherein transmitting comprises enabling the scheduler in the virtual machine to create a plurality of queues that each is associated with a corresponding location on the storage array;
receiving, by the virtual machine, a response from the storage array, the response including the requested layout information;
storing the requested layout information in a mapping database on the virtual machine;
organizing, by the virtual machine, one or more scheduling requests using the stored layout information; and
transmitting, by the scheduler in the virtual machine, the organized scheduling requests from the plurality of queues to the storage array.

18. The method of claim 17, wherein requesting layout information further comprises:
issuing, by the virtual machine, a Small Computer System Interface (SCSI) inquiry to the storage array; and
receiving, by the virtual machine, logical unit number (LUN) information from the storage array.

* * * * *